United States Patent [19]

Pizzo et al.

[11] 3,820,670
[45] June 28, 1974

[54] AUTOMOBILE SHIPPING CONTAINER UNLOADER

[75] Inventors: James J. Pizzo; William W. Elliott, both of San Jose, Calif.

[73] Assignee: FMC Corporation, San Jose, Calif.

[22] Filed: Mar. 12, 1973

[21] Appl. No.: 340,485

[52] U.S. Cl. .......... 214/16.1 DB, 214/730, 296/1 A
[51] Int. Cl. .............................................. E04h 6/06
[58] Field of Search... 214/16.1 R, 16.1 C, 16.1 CC, 214/16.1 D, 16.1 DB, 730

[56] References Cited
UNITED STATES PATENTS

| | | | |
|---|---|---|---|
| 2,629,507 | 2/1953 | Olson | 214/16.1 CA |
| 2,733,825 | 2/1956 | Evans | 214/16.1 C |
| 3,675,795 | 7/1972 | Dluhy | 214/16.1 CC |

FOREIGN PATENTS OR APPLICATIONS

| | | | |
|---|---|---|---|
| 1,183,752 | 3/1970 | Great Britain | 214/16.1 DB |

*Primary Examiner*—Robert J. Spar
*Assistant Examiner*—R. B. Johnson
*Attorney, Agent, or Firm*—R. S. Kelly; J. W. Edwards; C. E. Tripp

[57] ABSTRACT

Shipping containers having a plurality of storage levels, one superimposed above another, are used on railroad flatcars to support and enclose automobiles during transit. At each storage level in the shipping container, tracks are provided to receive the automobile wheels. Additional tracks are provided to receive restraints slidably fitted therein for interconnecting an automobile with the shipping container. A device for unloading automobiles from such shipping containers includes a mobile chassis with an elevator platform mounted thereon having an extractor arranged to project into the shipping container, automatically grip the restraints connected to an automobile, draw the automobile by the restraints from the shipping container onto the platform, and hold the automobile in place on the platform while the platform is in an elevated position. A trip mechanism is provided for automatically releasing the restraints when the platform is lowered to a position where the automobile can be driven from the platform. The extractor, which is mounted for reciprocal movement on the platform, has at least one arm extending therefrom with gripping jaws mounted at the distal end for engaging a restraint, and a guideway is provided on the platform for directing the arm to slide into the track holding the restraint. A linkage connected to the gripping jaws is coupled to a trip lever that can be pivoted when the platform is lowered so that the automobile will be released.

6 Claims, 9 Drawing Figures

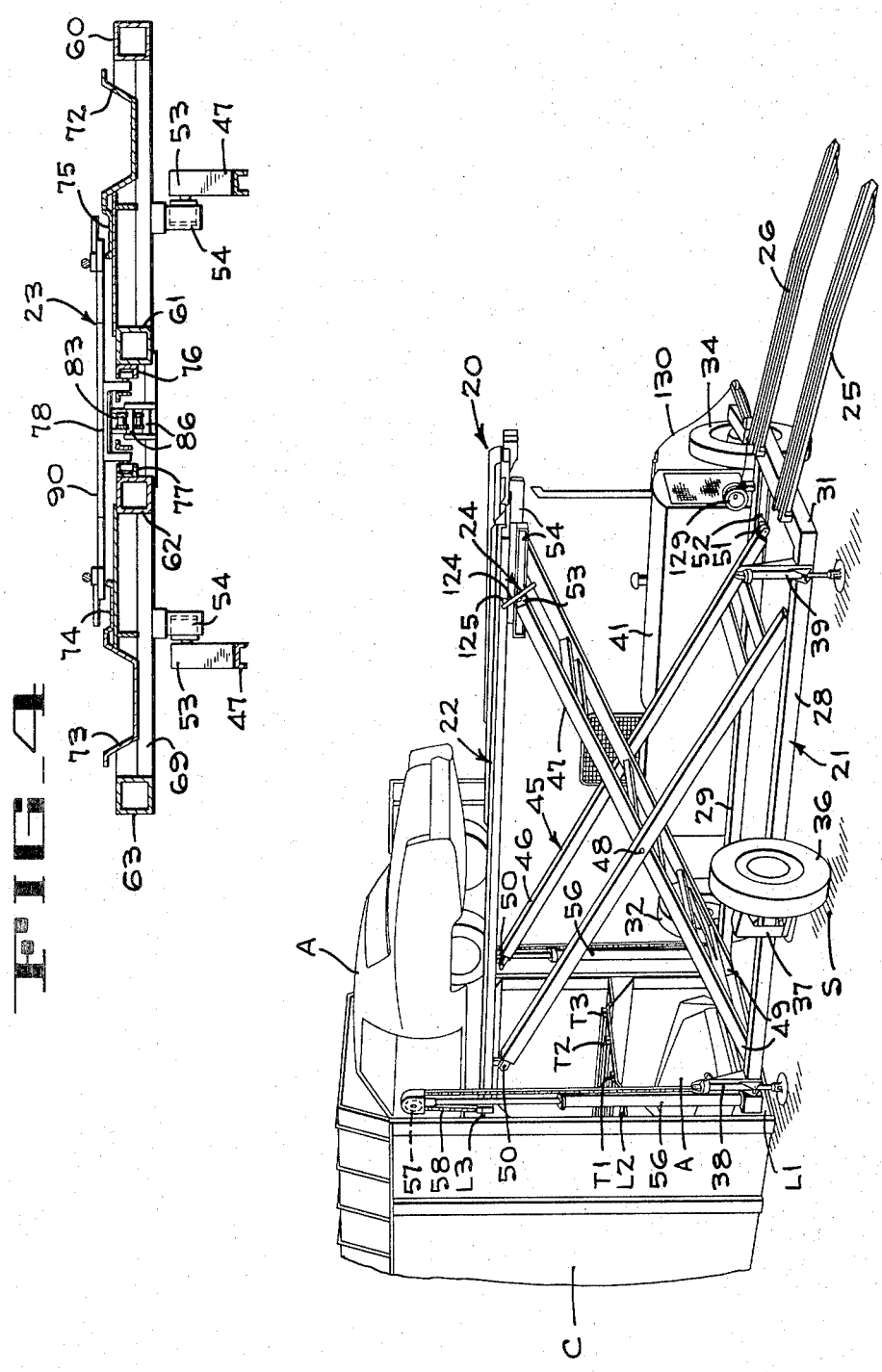

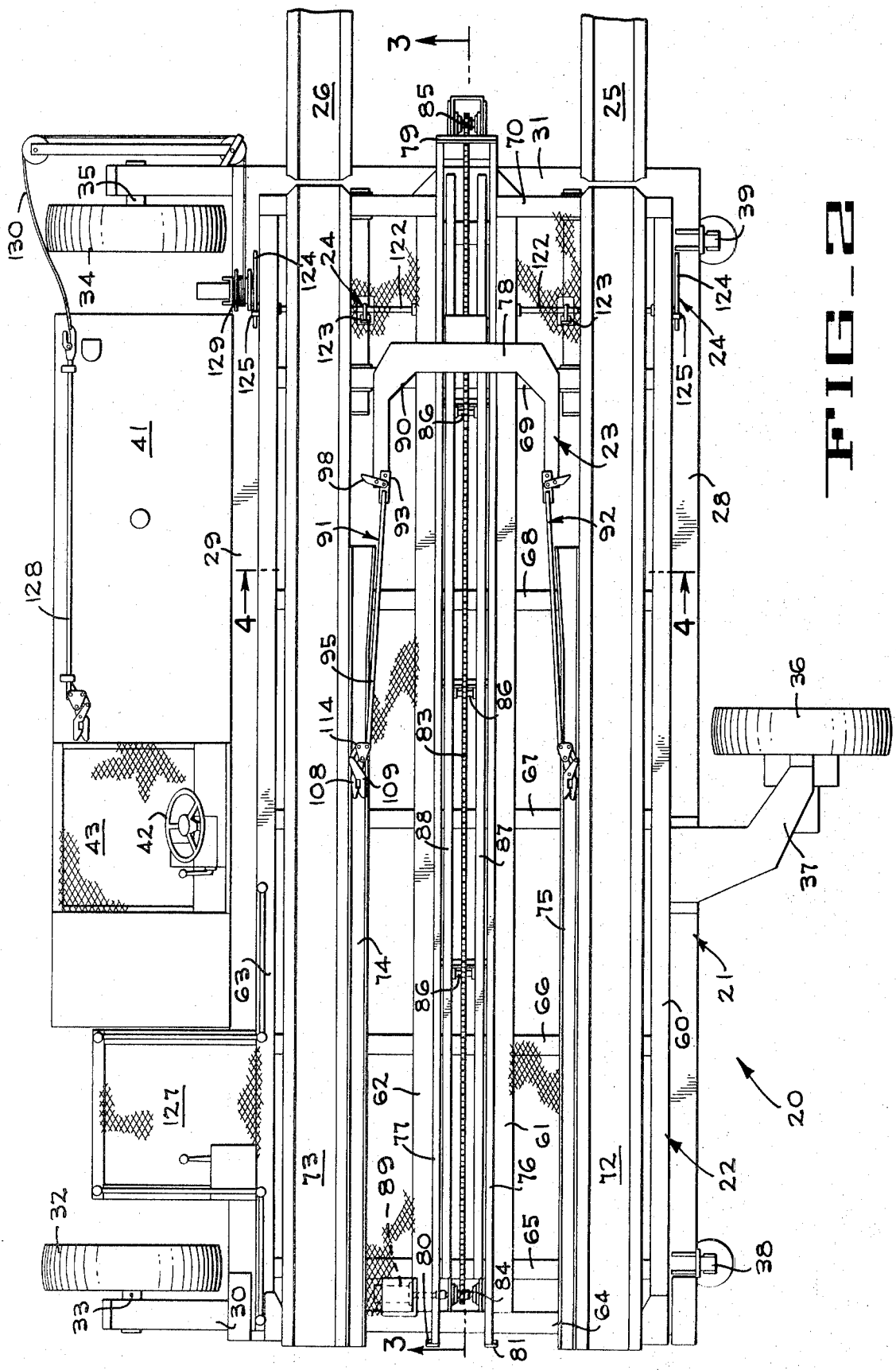

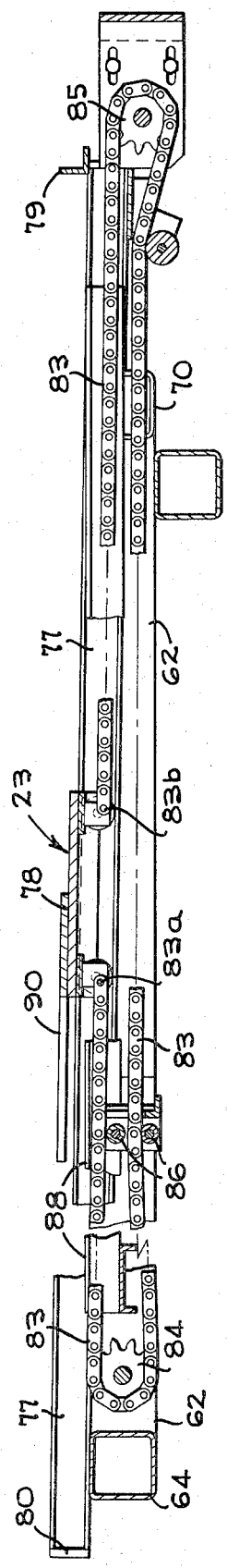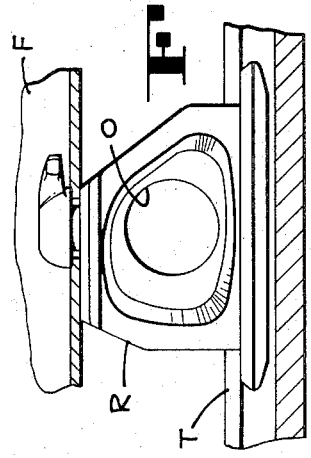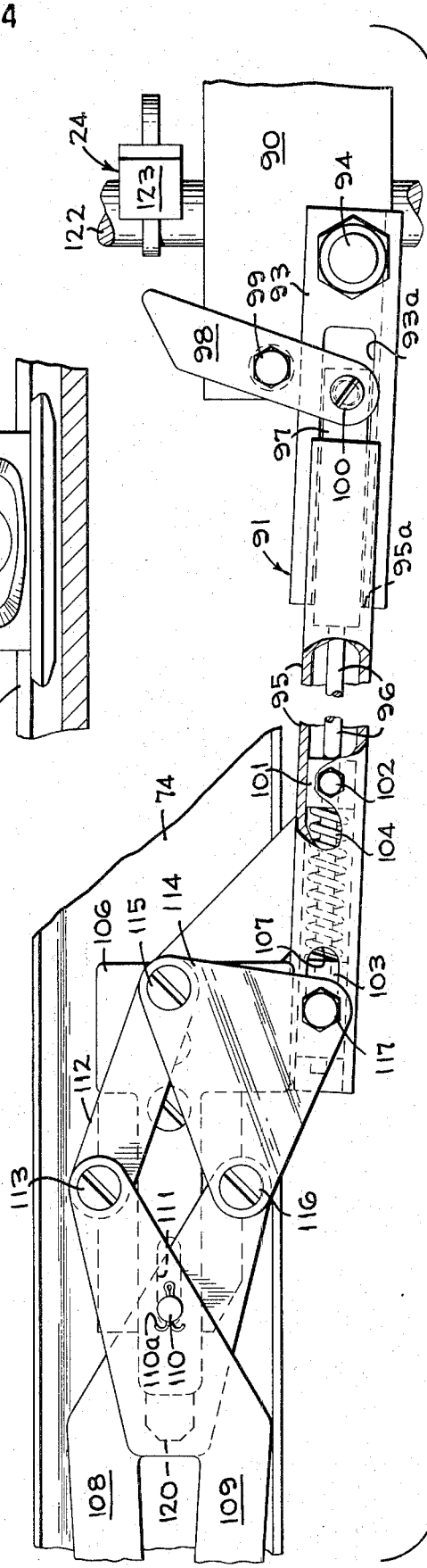

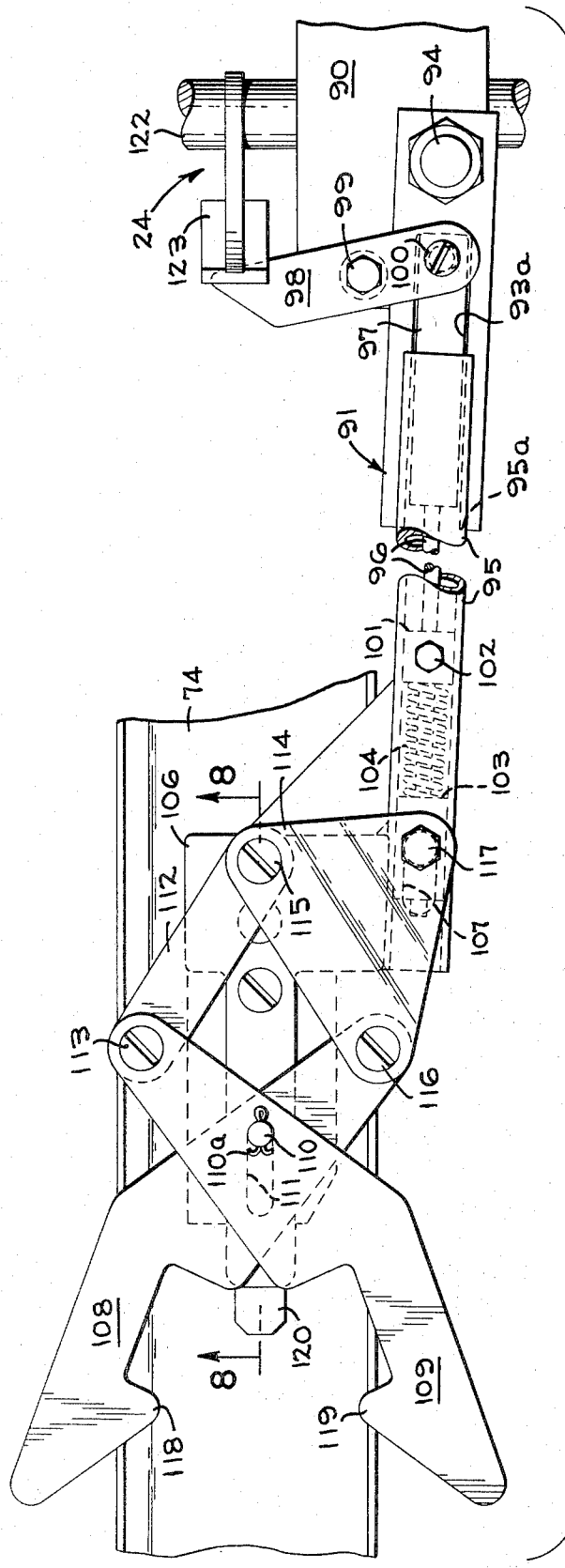
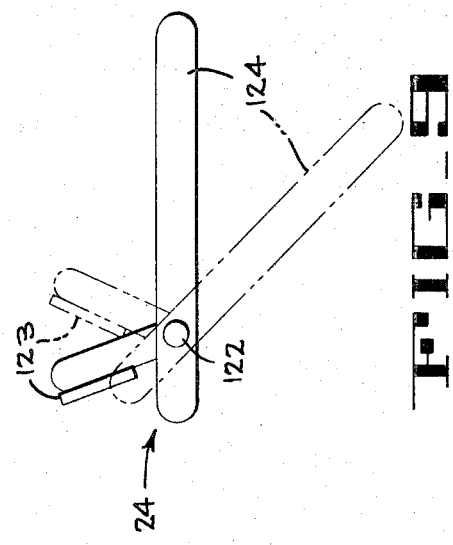
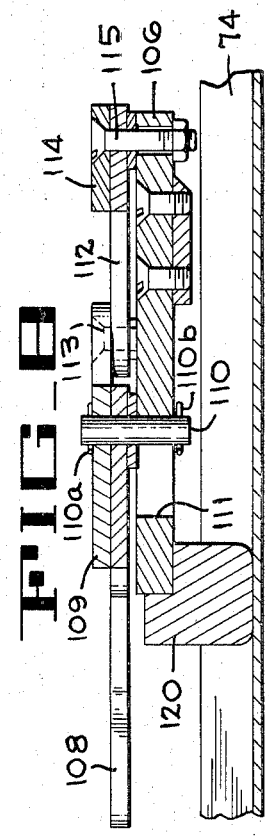
FIG_7
FIG_9
FIG_8

3,820,670

AUTOMOBILE SHIPPING CONTAINER UNLOADER

BACKGROUND OF THE INVENTION

1. Field of the Invention

This invention relates to article handling apparatus of a type used for unloading automobiles from shipping containers having a plurality of storage levels, one superimposed above another.

2. Description of the Prior Art

Shipping containers developed for use on railroad flatcars have been used to support and enclose automobiles during transit. Such a shipping container is disclosed in United States patent application, Ser. No. 149,986 of Donald R. Fylling et al., assigned to the same assignee as is the present application. These containers protect automobiles from weather damage and vandalism but present problems in loading and unloading since the automobiles are stacked therein with minimal clearance. A small crew should be able to extract one auto at a time from the shipping container and set the auto gently on the ground within a short period of time for efficient handling.

Elevator platforms within parking garages have been equipped with reciprocating means for gripping an automobile and drawing the automobile onto the platform or pushing the automobile therefrom. Such devices are disclosed in U.S. Pat. Nos. 1,977,785 and 2,070,792. U.S. Pat. No. 2,779,484 shows reciprocating means mounted on each floor of a parking garage adjacent the elevator for loading or withdrawing automobiles. While such prior art devices may work with parking garages, they would not be readily adaptable to the substantially different problems involved in withdrawing automobiles from a container. A mobile chassis with an elevator platform mounted thereon is shown in U.S. Pat. No. 3,666,127 but this device for removing cargo from airplanes would not be readily adaptable to the problem of withdrawing automobiles from shipping containers.

SUMMARY OF THE INVENTION

An elevator platform mounted upon a mobile chassis includes an extractor which is arranged to project into an automobile shipping container, automatically grip one or more restraints which are connected to an automobile, draw the automobile by the restraints from the shipping container onto the platform, and hold the automobile in place on the platform by the restraints while the platform is in an elevated position. A trip mechanism is also provided for automatically releasing the restraints when the platform is lowered to a position where the automobile can be directly driven from the platform.

BRIEF DESCRIPTION OF THE DRAWING

FIG. 1 is a perspective view of an automobile unloading device embodying the present invention, said device being shown extracting an automobile from a shipping container.

FIG. 2 is a plan view of the automobile unloading device shown in FIG. 1.

FIG. 3 is an enlarged broken section taken on the line 3—3 of FIG. 2.

FIG. 4 is an enlarged section taken on the line 4—4 of FIG. 2.

FIG. 5 is a side elevation view of a restraint used to secure an automobile to a track within the shipping container.

FIG. 6 is a broken plan view of a restraint gripping arm.

FIG. 7 is a broken plan view of the restraint gripping arm similar to FIG. 6 but showing the gripping arm tripped to an open gripping jaw position.

FIG. 8 is a section taken on the line 8—8 of FIG. 7.

FIG. 9 is a detail view of the trip mechanism for opening the gripping jaws and releasing the restraint when the platform is lowered to a position from which an automobile can be driven directly off of the platform.

DESCRIPTION OF THE PREFERRED EMBODIMENT

With reference to FIG. 1, an unloader 20 is provided which has a mobile chassis 21 that can move about a substantially horizontal surface S to align an elevator platform 22, mounted for vertical movement upon the chassis, with an open end of a shipping container having storage levels L1, L2 and L3. An automobile A can be fitted into the shipping container at each storage level and secured thereto during shipment by restraints R (FIG. 5) which interconnect the automobile frame F with a corresponding restraint track T1, T2, or T3 (FIG. 1). An extractor 23 (FIG. 2) is mounted upon platform 22 and is arranged to be projected from the platform into the shipping container. The extractor automatically grips the restraints R which are connected to an automobile and slidably fitted in tracks T1 and T3, draws the automobile from the shipping container onto the platform, and holds the automobile in place on the platform while the platform is in an elevated position. When the platform is lowered to a lowermost position adjacent the mobile chassis 21, a trip mechanism 24 causes the extractor to release the restraints, allowing the automobile to be driven from the platform down ramps 25 and 26.

Mobile chassis 21, which is shown more clearly in FIG. 2, includes a pair of parallel longitudinal beams 28 and 29 connected to a pair of transverse end beams 30 and 31 so as to form a rectangular frame structure. A rear wheel 32 is mounted upon a stub axle 33 projecting from end beam 30, and a similar rear wheel 34 is mounted upon a stub axle 35 projecting from end beam 31. A front wheel 36 is connected by a suspension system 37 to longitudinal beam 28 near the midportion thereof and the wheel is arranged to be both driven and steered by conventional hydraulic power mechanisms. The three wheels should always be in contact with the ground regardless of the nature of the terrain in order to provide stability for the unloader, and the chassis can be further stabilized, when in a stationary position, by hydraulic jacks 38 and 39 located near opposite ends of beam 28.

Mounted to chassis 21 adjacent longitudinal beam 29 is a housing 41 that encloses a power plant, hydraulic pumps and a hydraulic fluid reservoir. A steering wheel 42 is provided above an operator's platform 43 that is supported from beam 29 adjacent to the housing 41. The steering wheel regulates the quantity of hydraulic fluid flowing from a hydraulic power source to a pair of steering cylinders connected in parallel so that the amount of fluid that each cylinder receives is proportional to the rotation of the wheel in a given direction. Controls are also provided adjacent the operator's platform for a hydraulic pump of the variable displacement, over-center, reversible flow, piston type which supplies hydraulic fluid to a fixed displacement motor for driving the wheel 36 in forward or reverse directions. Since the details of the hydraulic components and controls for steering and driving the unloader are not considered to be critical to the present invention, they will not be further shown or described herein.

Platform 22 is mounted upon chassis 21 for elevational movement by a stabilizing mechanism 45 (FIG. 1) of a conventional scissors type that includes two intersecting rectangular frames 46 and 47 pivotally connected together at the line of intersection by a transverse pin 48. Each frame includes a pair of longitudinal members on opposite sides of the chassis rigidly spaced by transverse braces. The lower end 49 of each longitudinal member in frame 47 is pivotally connected to the chassis. The upper end 50 of each longitudinal member in frame 46 is pivotally connected to the underside of the platform 22. A roller 51 is provided at the lower end of each longitudinal member in frame 46 to ride along a sill 52 in the chassis, and an end 53 of each longitudinal member in frame 47 is in rolling engagement with a channel 54 mounted on the underside of the platform.

Two laterally spaced hydraulic cylinders 56 (FIG. 1) are mounted in an upright position on chassis 21. The piston of each cylinder is connected to a pulley 57. A chain 58 is trained about the pulley with one end thereof being anchored to chassis 21 and with the other end thereof being connected to platform 22 so that as the piston extends outward from the cylinder, the platform will be elevated above the chassis.

Platform 22 (FIG. 2) includes a rectangular frame mounted by four longitudinal members 60, 61, 62 and 63 held in spaced relationship by transverse braces 64, 65, 66, 67, 68, 69 and 70. A pair of channel shaped tracks 72 and 73 (FIGS. 2 and 4) are mounted longitudinally upon the platform for supporting the wheels of an automobile A. A guideway 74 is mounted on the platform adjacent the inward side of track 72 and a similar guideway 75 is mounted adjacent the inward side of tracks 73. A pair of tracks 76 and 77 are mounted longitudinally of the platform near the midportion thereof to support a carriage 78 (part of extractor 23) that travels along the tracks from a stop 79 at one end to the vicinity of closure plates 80 and 81 at the other end thereof.

Movement of carriage 78 along tracks 76 and 77 is controlled by an endless sprocket chain 83 having one free end 83a (FIG. 3) connected to the front of the carriage and the opposite free end 83b connected to the rear of the carriage. One end of the thus formed endless chain is trained about a drive sprocket 84 mounted at one end of the chassis, and the other end of the endless chain is trained about an idler sprocket 85 mounted at the opposite end of platform 22. The chain is supported intermediately by support rollers 86. A pair of chain guards 87 and 88 (FIG. 2) are mounted longitudinally of the platform on opposite sides of the sprocket chain. A motor 89 drives the drive sprocket 84, and idler sprocket 85 is adjustably mounted (as shown in FIG. 3) to take up slack in the sprocket chain. Preferably, motor 89 is a hydraulic motor driven by fluid supplied from a common hydraulic fluid reservoir by a hydraulic pump.

Carriage 78 which is part of extractor 23 has a mounting plate 90 of C-shape which overlies the carriage (FIG. 2) and extends outwardly therefrom over the platform. Arm assemblies 91 and 92 are connected to opposed ends of the mounting plate. Since the arm assemblies are similar, with the exception that one assembly is oppositely oriented from the other, only arm assembly 91 will be described in detail.

As shown in FIG. 6, arm assembly 91 includes an end connector 93 pivotally attached to mounting plate 90 by a bolt 94. A tube 95 has a slotted end portion 95a that fits about the end connector and welded thereto with the center of the tube aligned with a slot 93a in the end connector while the tube projects forwardly therefrom. A rod 96 is movably fitted within the tube and has an end piece 97 slidably fitted within the slot in the end connector. A trip lever 98 is pivotally mounted at its center portion upon the projecting end of the mounting plate 90 by a bolt 99 and is coupled at one end by a bolt 100 to the rod end piece 97. The opposite end of the trip lever projects outward in a generally horizontal plane from the arm assembly and mounting plate as shown in FIG. 6. A stop 101 is fixed in an intermediate position within tube 95 by a bolt 102 and rod 96 is slidably fitted through the stop. An end piece 103 is fixed to the end of rod 96 within the tube and a compression spring 104 is fitted about the rod between the stop and the end piece 103 to urge the end piece and rod forwardly from the stop.

A mount 106 (FIGS. 6, 7 and 8) is welded to the distal end of tube 95 for traveling within guideway 74 and a slot 107 is provided within the tube above end piece 103. A pair of gripping jaws 108 and 109 are pivotally connected together by a pin 110 that extends vertically through the jaws and a slot 111 in the mount. Cotter pins 110a and 110b hold the pin in place within the jaws and mount. A line 112 is pivotally connected to jaw 109 by a bolt 113 and the link is pivotally connected to a heel plate 114 and the mount by a bolt 115. Jaw 108 is pivotally connected to the heel plate by a bolt 116 and the heel plate is connected to end piece 103 by a bolt 117 that fits through slot 107. Thus, it will be seen that when end piece 103 is urged by spring 104 to position bolt 117 at the forward end of slot 107, as shown in FIG. 6, jaws 108 and 109 will be in a closed position but when rod 96 pulls bolt 117 to the opposite end of slot 107, as shown in FIG. 7, the jaws will be in an open position.

Jaw 108 has an inwardly projecting lug 118, as shown in FIG. 7, and jaw 109 has an inwardly projecting lug 119. The ends of the jaws are angled inwardly towards the lugs forming a notch that fits about a restraint R and pressure between the jaws and the restraint tends to spread the jaws apart until the jaw lugs fit into an opening O in the restraint. A nose 120 of mount 106 contacts the restraint R when the jaw lugs are fitted into the restraint opening to transfer force directly from the mount to the restraint and thereby prevent the jaws from opening upon further pressure. Thus, it will be seen that the jaws can automatically grip a restraint by contact therewith and sufficient forward pressure to spread the jaws until the lugs fit into the restraint opening.

When carriage 78 is retracted to a position in abutment with stop 79, trip levers 98 of arm assemblies 91 and 92 are positioned adjacent trip mechanism 24. This mechanism includes a crank shaft 122 mounted for rotation on platform 22 with a pair of lugs 123 projecting from the crankshaft in generally vertical planes that intersect the generally horizontal planes of the trip levers. A handle 124 is mounted at each end of the crankshaft and a stop 125 projects from each side of the platform to limit downward rotation of the handles in response to gravity to a position inclined at a 45 degree angle downwardly from the horizontal platform, as shown in FIG. 1 and as indicated in phantom line in FIG. 9. When the platform is lowered to chassis 21, handles 124 contact longitudinal beams 28 and 29 of the chassis and pivot upward to a horizontal position, as indicated in solid line in FIG. 9. This upward movement of the handles rotates the crankshaft so that lugs 123 move forward to force trip levers 98 away from the crankshaft and draw rods 96 rearward within tubes 95 opening jaws 108 and 109 to release the restraint R.

An operator's platform 127 is mounted on longitudinal member 63 of platform 22 and controls are provided for raising and lowering platform 22 and reciprocating carriage 78.

An auxiliary extractor 128 stowed upon housing 41 includes an arm assembly and grip similar to arm assemblies 91 and 92 but is adapted for manual operation. A workman removes the auxiliary extractor from the housing and manually inserts it into a restraint track on the ground level of an adjacent shipping container to grip a restraint holding an automobile. A winch 129 is used to take up on a cable 130 connected to the auxiliary extractor for withdrawing the automobile while the unloader 20 is withdrawing automobiles from upper levels of adjacent shipping containers.

In operation, an unloader 20 is positioned adjacent the open end of a shipping container C, as shown in FIG. 1. A platform operator and an automobile driver ride platform 22 upward to a level corresponding to a storage level from which an automobile is to be withdrawn. Carriage 78 moves toward the shipping container and arm assemblies 91 and 92 follow guideways 74 and 75 on the platform into restraint tracks T1 and T3 of the shipping container. Jaws 108 and 109 automatically grip restraints R upon contact therewith and the carriage is retracted to a position in abutment with stop 79 drawing the automobile by the restraints from the shipping container onto the platform. The driver then enters the automobile which is held in place on the platform by the restraints and the platform is lowered toward chassis 21. When handles 124 contact the chassis, further lowering of the platform causes the handles to rotate upward to a horizontal position. This movement of the handles turns crankshaft 122 so that lugs 123 force trip levers 98 to draw rods 96 rearwardly and open jaws 108 and 109 to release restraints R. The driver then drives the automobile from the platform down ramps 25 and 26 to surface S where the automobile is parked and the procedure is repeated.

Although the best mode contemplated for carrying out the present invention has been herein shown and described, it will be apparent that modification and variation may be made without departing from what is regarded to be the subject matter of the invention.

What is claimed is:

1. A device for unloading automobiles from a shipping container which has a plurality of storage levels, one superimposed above another, with tracks at each storage level receiving restraints slidably fitted therein for interconnecting an automobile with the track during shipment of the container, said automobile unloading device comprising a chassis mobile upon a substantially horizontal surface; a platform mounted upon said chassis for vertical movement between a lowermost position and positions thereabove corresponding to storage levels in the shipping container; an extractor mounted upon said platform for projecting into the shipping container, automatically gripping said restraints connected to said automobile, drawing the automobile by the restraints from the shipping container onto the platform, and holding the autombile in place on the platform by the restraints while the platform is in an elevated position; and a trip mechanism mounted on said platform to contact said extractor for automatically releasing the restraints when the platform is lowered to a position where the automobile can be driven directly from the platform.

2. A device for unloading automobiles as described in claim 1 wherein said extractor includes a carriage mounted upon said platform for reciprocal movement longitudinally thereof toward and away from one end of the platform adjacent the shipping container, at least one arm mounted upon the carriage for projecting into the shipping container when the carriage is adjacent thereto, and gripping jaws mounted at the distal end of the projecting arm for engaging a restraint upon contact therewith; and said platform has a guideway mounted thereon for directing said extractor arm and gripping jaws to slide into a track holding the restraint in the shipping container.

3. A device for unloading automobiles as described in claim 2 wherein said extractor arm includes a linkage connected to the gripping jaws, a trip lever connected to said linkage and projecting outwardly from said arm, and said trip mechanism being arranged to engage said trip lever when the platform is lowered to its lowermost position to open the restraint gripping jaws.

4. A device for unloading automobiles as described in claim 3 wherein said trip mechanism includes a crankshaft mounted on the platform, a crank handle depending from the crankshaft to contact the chassis as the platform is lowered to its lowermost position thereby rotating the crankshaft, and a lug projecting from the crankshaft in a plane that intersects the plane of said trip lever whereupon rotation of the crankshaft, the lug contacts the trip lever to open the restraint gripping means.

5. A device for unloading automobiles as described in claim 4 including control means for stopping said carriage in a retracted position remote from the platform end adjacent the shipping container where the trip lever is aligned to be contacted by the lug upon rotation of the crankshaft.

6. A device for unloading automobiles as described in claim 1 wherein said extractor includes a carriage mounted upon said platform for reciprocal movement longitudinally thereof toward and away from one end of the platform adjacent the shipping container, at least one arm mounted upon the carriage for projecting into the shipping container when the carriage is adjacent thereto, and gripping jaws mounted at the distal end of the arm projecting from the carriage for engaging a restraint upon contact therewith; said gripping jaws having lugs projecting inwardly therefrom and defining a notch to fit about a restraint, means for mounting said jaws to open upon contact pressure with a restraint that spreads the jaws apart until the lugs fit into an opening in the restraint, and a mount fixed to the distal end of said arm for supporting the jaws, said mount having a nose portion adapted to contact the restraint when the jaws are closed with the lugs thereof fitting into the restraint opening thereby transferring force directly from the mount to the restraint and preventing further opening pressure upon the jaws.

* * * * *

UNITED STATES PATENT OFFICE
CERTIFICATE OF CORRECTION

PATENT NO. : 3,820,670
DATED : June 28, 1974
INVENTOR(S) : JAMES J. PIZZO ET AL

It is certified that error appears in the above-identified patent and that said Letters Patent are hereby corrected as shown below:

Column 2, line 23: after "container" insert -- C --.

Column 3, line 38: change "mounted" to -- formed --.

Column 4, line 39: change "line" to -- link --.

Signed and Sealed this twenty-ninth Day of July 1975

[SEAL]

Attest:

RUTH C. MASON
Attesting Officer

C. MARSHALL DANN
Commissioner of Patents and Trademarks